United States Patent
Kurechi

[15] 3,700,316
[45] Oct. 24, 1972

[54] CINEMATOGRAPHIC FILM MAGAZINE

[72] Inventor: Taichi Kurechi, Ashigara-Kamigun, Kanagawa, Japan

[73] Assignee: Fuji Photo Film Co., Ltd., Kanagawa, Japan

[22] Filed: Sept. 3, 1971

[21] Appl. No.: 177,722

[30] Foreign Application Priority Data

Sept. 3, 1970 Japan .....................45/87802

[52] U.S. Cl. ..............................352/78 C, 352/172
[51] Int. Cl. .........................G03b 23/02, G03b 1/60
[58] Field of Search ............352/72, 78 C, 78 R, 172

[56] References Cited

UNITED STATES PATENTS

| 3,630,170 | 12/1971 | Christo | 352/172 X |
| 3,529,890 | 9/1970 | Buon | 352/78 R |
| 2,326,654 | 8/1943 | Jagust | 352/78 R X |
| 2,475,898 | 7/1949 | Jacobson | 352/78 R X |

Primary Examiner—Samuel S. Matthews
Assistant Examiner—Monroe H. Hayes
Attorney—Richard G. Sughrue et al.

[57] ABSTRACT

A plurality of grooves, in which the upright portion of a magazine stopper fits, are provided in the outer wall of a cinematographic film magazine between the take-up and supply shafts thereof, and the magazine, when placed on the magazine stopper, is balanced at one of the grooves, and detecting the amount of unexposed film in the magazine occurs by reading the graduation corresponding to the groove.

2 Claims, 6 Drawing Figures

Patented Oct. 24, 1972 3,700,316
FIG. 1 FIG. 2 FIG. 3
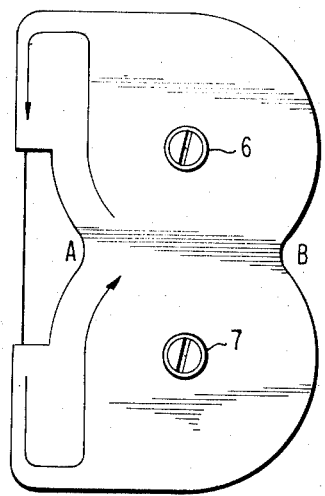
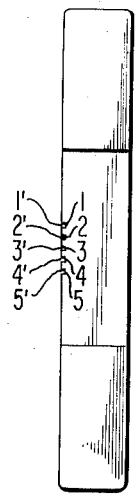
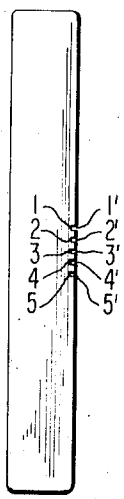
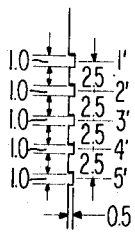
FIG. 5
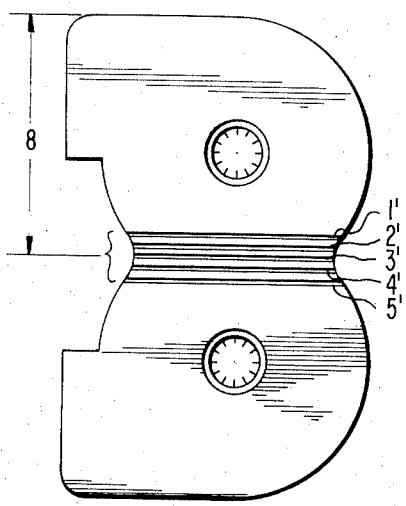
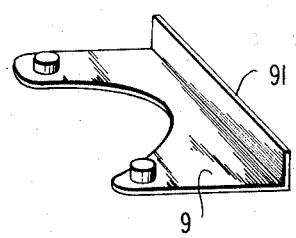
FIG. 4 FIG. 6

CINEMATOGRAPHIC FILM MAGAZINE

BACKGROUND OF THE INVENTION

1. Field of the Invention

The present invention relates generally to a film magazine, and especially to a cinematographic film magazine, i.e., a film magazine for a motion picture camera. More particularly, the present invention relates to a film magazine for 8 mm cinematographic system, commonly called "Single Eight," which is hereafter referred to as S-8 film magazine.

2. Description of the Prior Art

Such a film magazine is commonly made to enable it to be exchanged with another film magazine in a camera (e.g., color to back and white, black and white to color, high sensitive to low sensitive, and so on), even if in the course of photographing, i.e., with remaining unexposed film carried therein. The film magazine, however, has the inconvenience in that the counter in the camera is not able to indicate the correct amount of unexposed film when the exchange magazine is again mounted into the camera after the exchange. Accordingly, the user has to memorize the amount of unexposed film in the exchanged magazine in order to make the counter indicate the amount correctly.

SUMMARY OF THE INVENTION

The present invention intends to overcome the above noted inconvenience and accordingly, it is a prime object of the present invention to provide a film magazine having means for detecting the amount of unexposed film therein. A further object of the present invention is to provide a film magazine having simple means for measuring the above noted amount without using any special apparatus.

In accordance with the present invention, a plurality of grooves are provided in the outer wall of a film magazine between the take-up and the supply shafts thereof, and one of the grooves indicates the amount of unexposed film therein, when balancing the magazine at the groove. In addition, a magazine stopper is utilized for the above noted balancing in a special embodiment of the present invention.

BRIEF DESCRIPTION OF THE DRAWINGS

The principle, the objects and the advantages of the present invention will be better understood from the following description taken in connection with the accompanying drawings, in which:

FIG. 1 is a front view of an S-8 film magazine.

FIG. 2 is a side view of the S-8 film magazine of FIG. 1 from side A.

FIG. 3 is a side view of the S-8 film magazine, from side B.

FIG. 4 is a rear view of the S-8 film magazine.

FIg. 5 is an enlarged side view of the portion of the S-8 film magazine wherein the grooves are provided.

FIG. 6 is a perspective view of the magazine stopper.

DESCRIPTION OF THE PREFERRED EMBODIMENT

Referring to the drawings illustrating an embodiment of the present invention, the principle of the invention is explained in that, the amount of film shifted from the take-up portion 6 to the supply portion 7 in the S-8 film magazine during a photographing operation can be detected by the changes in weight of both portions, and accordingly, the amount is checked with grooves 1', 2', 3', 4', 5' and the graduations 1, 2, 3, 4, 5, i.e., the film magazine is balanced at one of the grooves according to the weight difference between both portions 6 and 7. Besides, in the present embodiment, the magazine stopper 9 shown in FIG. 6 is used as the supporting member to achieve the above noted balancing.

S-8 film is 15.2 meters in full length, and five check points are prepared thereon with 2.5 meters spacing, i.e., at the positions of 2.5 m, 5.0 m, 7.5 m, 10.0 m and 12.5 m (cf. the last space is 2.7 meters). Thus, the positions of the grooves as the results are shown by the following table:

| Groove | Position (Length 8 in (FIG. 4) | Length of Taken-up Film | Length of Unexposed Film |
|---|---|---|---|
| 1' | 47 mm | 2.5 m | 12.7 m (5/6) |
| 2' | 49.5 | 5.0 | 10.2 m (2/3) |
| 3' | 52.0 | 7.5 | 7.7 m (1/2) |
| 4' | 54.5 | 10.0 | 5.2 m (1/3) |
| 5' | 57.0 | 12.5 | 2.7 m (1/6) | where the fraction in the brackets shows the ratio of unexposed film length to the whole film length.

The width and depth of the groove, as shown in FIG. 5 are determined to be 1 mm and 0.5 mm, respectively, with relation to the thicknesses of the magazine and the magazine stopper 9 (cf. the magazine stopper is 0.6 thick). The graduations 1, 2, 3, 4, 5 shown in FIGS. 2 and 3 may be designed to indicate the amount of unexposed film.

In order to detect the amount of unexposed film, in the present embodiment of the invention, the film magazine including unexposed film is placed on the upright portion 91 of the magazine stopper 9, and one of the grooves 1', 2', 3', 4', 5' is searched out and selected for balancing the magazine. Thus, the graduation corresponding to the groove will make the amount of unexposed film apparent. If the balance is not acquired at any one of the grooves, but at the intermediate portion between two of the grooves, the amount of unexposed film will be between the graduations corresponding to the two grooves.

From the above description, it will be apparent that the present invention provides the advantage of simply detecting the amount of unexposed film in a film magazine without using any special apparatus.

What is claimed is:

1. In a cinematographic film magazine incorporating a take-up and a supply reel with a film threaded at respective ends thereto and reelable therebetween, the improvement comprising:

a plurality of spaced parallel grooves formed within said film magazine wall intermediate of said reels and at right angles to a line passing through the reel axes; each groove being identified by an accompanying indicia each of said plurality of grooves being so spaced relative to the supply and take-up reels that the weight of the magazine and film is equally divided on each side of a given groove when the distribution of the film between the supply and take-up reels is as indicated by the indicia adjacent said groove.

2. The film magazine as claimed in claim 1, further including a right angle member whose edge has dimensions on the order of those of said grooves.

\* \* \* \* \*